(12) United States Patent
Ballard et al.

(10) Patent No.: US 7,427,582 B2
(45) Date of Patent: Sep. 23, 2008

(54) INTERNAL BREAKER

(75) Inventors: David A Ballard, Stonehaven (GB); Christopher A Sawdon, Biscovery (GB); Trevor G Jappy, Buckie (GB)

(73) Assignee: M-I L.L.C., Houston, TX (US)

( * ) Notice: Subject to any disclaimer, the term of this patent is extended or adjusted under 35 U.S.C. 154(b) by 314 days.

(21) Appl. No.: 10/990,707

(22) Filed: Nov. 17, 2004

(65) Prior Publication Data

US 2005/0090404 A1 Apr. 28, 2005

Related U.S. Application Data

(63) Continuation of application No. 10/026,063, filed on Dec. 19, 2001, now Pat. No. 6,861,394.

(51) Int. Cl.
   *C09K 8/72* (2006.01)
(52) U.S. Cl. .................. 507/119; 507/111; 507/112; 507/120; 507/140
(58) Field of Classification Search .......... 507/269, 507/272, 140, 902, 906, 921, 111, 112, 119, 507/120
   See application file for complete search history.

(56) References Cited

U.S. PATENT DOCUMENTS

| 4,741,401 | A | * | 5/1988 | Walles et al. ............... 166/300 |
| 5,124,176 | A | | 6/1992 | Marrion et al. |
| 5,253,711 | A | * | 10/1993 | Mondshine ................ 166/300 |
| 5,437,331 | A | | 8/1995 | Gupta et al. |
| 5,492,646 | A | | 2/1996 | Langley et al. |
| 5,624,886 | A | * | 4/1997 | Dawson et al. .............. 507/217 |
| 5,783,527 | A | * | 7/1998 | Dobson et al. .............. 507/269 |
| 5,851,235 | A | | 12/1998 | Baillely et al. |
| 5,981,447 | A | * | 11/1999 | Chang et al. ................ 507/271 |
| 6,138,760 | A | * | 10/2000 | Lopez et al. ................ 166/300 |
| 6,207,620 | B1 | * | 3/2001 | Gonzalez et al. ............ 507/277 |
| 6,209,646 | B1 | * | 4/2001 | Reddy et al. ................ 166/300 |
| 6,225,262 | B1 | | 5/2001 | Irwin et al. |
| 6,357,527 | B1 | * | 3/2002 | Norman et al. ............. 166/300 |
| 6,793,018 | B2 | * | 9/2004 | Dawson et al. ............. 166/300 |
| 6,818,594 | B1 | * | 11/2004 | Freeman et al. ............ 507/101 |
| 6,861,394 | B2 | * | 3/2005 | Ballard et al. ............... 507/269 |
| 2002/0125012 | A1 | * | 9/2002 | Dawson et al. ............. 166/300 |
| 2005/0016733 | A1 | * | 1/2005 | Dawson et al. ........... 166/308.2 |

FOREIGN PATENT DOCUMENTS

| EP | 0672740 | 9/1995 |
| EP | 0919695 | 6/1999 |
| EP | 1152121 | 11/2001 |
| WO | 96/25478 | 8/1996 |

OTHER PUBLICATIONS

Definition "polysaccharide", Hawley's Condensed Chemical Dictionary, 2002.*
Extended European Search Report dated Jan. 28, 2008 issued in EP Application No. 07120811.0 (5 pages).

* cited by examiner

*Primary Examiner*—Margaret G Moore
(74) *Attorney, Agent, or Firm*—Osha Liang LLP

(57) ABSTRACT

A wellbore fluid including a peroxide degradable polymer and an encapsulated peroxide source. The peroxide degradable polymer may be a polysaccharide. The peroxide source may include an inorganic peroxide, including zinc and alkaline earth metal peroxides, such as magnesium peroxide. The encapsulating material may be a polymer, including enteric polymers. The release of peroxide, from peroxide sources generally, can be controlled by means of pH such that peroxide source can be activated, and peroxide released, by a change in pH. In a wellbore, this pH change can be effected by using produced fluids to lower the pH of a more basic wellbore fluid.

8 Claims, No Drawings

INTERNAL BREAKER

CROSS REFERENCE TO RELATED APPLICATIONS

This is a continuation of U.S. application Ser. No. 10/026,063, filed Dec. 19, 2001, Publication No. U.S. 2003-0114314-A1, now U.S. Pat. No. 6,861,394 the disclosure of which is incorporated herein by reference.

BACKGROUND OF THE INVENTION

During the creation and subsequent operation of a subterranean well, the operator may wish to perform acts that could potentially damage the underground formations and their ability to produce desirable formation fluids. For example, the operator may wish to inject water into the well. The operator may do this to enhance the productivity of a well or to dispose of waste water.

In addition to water, other fluids are routinely used in the operation of a subterranean well. Drilling fluids are used to aid in the drilling of a well; both to cool the drill bit and to remove drill cuttings from the well. Completion fluids are used when completion operations are performed in a producing formation. Workover fluids are used when working over previously completed wells. In all of these cases, it can be desirable to seal off producing formations in order to prevent fluid loss from the well to the formation and to prevent possible damage to the formation.

One way of protecting the formation is by forming a filter cake on the surface of the subterranean formation. Filter cakes are formed when particles suspended in a wellbore fluid coat or plug the pores in the subterranean formation such that fluid is substantially prevented from passing between the formation and the wellbore and vice versa. A number of ways of forming filter cakes are known in the art, including the use of both clay and non-clay based drilling fluids.

In addition to the intentional formation of filter cakes, filter cakes can also be produced unintentionally. For instance, when drilling the well, the particles contained in the drilling mud can lodge in the pores of a formation that the operator desires to bring into production.

Whether the formation of the filter cake was unintentional and intentional, it is desirable to remove the filter cake when the formation is brought into production. The presence of the filter cake can hinder the passage of fluid from the formation to the wellbore and thereby retard production rates.

Various ways have been developed by those skilled in the art to form filter cakes that can be easily removed. For example U.S. Pat. No. 5,251,697 discloses the addition of calcium carbonate to water being injected into a well. The calcium carbonate particles either clog the pores in the subterranean rock formations or collect and build a filter cake. When the filter cake is to be removed, the '697 patent directs the operator to circulate an acid wash, preferably hydrochloric acid, into the well. The acid wash will dissolve the calcium carbonate and thereby destroy the filter cake. At this point the well can be brought into production or additional work performed on the well.

In U.S. Pat. No. 5,607,905 is disclosed a method of forming a filter cake using a fluid containing polysaccharide polymers, bridging particles and an alkaline earth metal or zinc peroxide. The method of the '905 patent seeks to have to particles in the fluid bridge over the formation pores rather than plug the holes. The polysaccharide polymers are typically added to the wellbore fluid as viscosifiers or fluid loss control additives. An earlier patent, U.S. Pat. No. 5,238,065, taught that filter cakes containing polysaccharide polymers could be removed by contacting the filter cake with a brine fluid containing a zinc or alkaline earth metal peroxide, an acidic substance such that the pH of the solution was between 1 and 8 and an activator for the peroxide. A wash solution would then be used to remove the filter cake. The degrading substance incorporated within the filter cake is generally referred to as an internal breaker. The use of an internal breaker was beneficial because it required less peroxide, less loss of wash fluid to the formation, and gave more complete removal of the filter cake.

However, these prior art systems contain several drawbacks. First, the peroxides used have a tendency to emit peroxide prior to activation, resulting in premature weakening of the filter cake as well as reducing the effectiveness of the polymers used to control fluid loss and viscosity. Additionally, these prior art methods require action on the part of the operator to remove the filter cake. This results in additional cost and delay. Also, the acid or other solutions used to dissolve filter cakes can have a harmful effect on the formation. The present invention provides an improved method for removing filter cakes in a subterranean well and the formulation and use of drilling fluids used to form such filter cakes.

SUMMARY OF THE INVENTION

One illustrative embodiment of the present invention is directed to a method of forming and subsequently removing filter cakes formed in a subterranean well. The filter cakes are formed using wellbore fluids to which have been added peroxide degradable polymers. A wellbore fluid containing a peroxide source should also be used in forming the filter cake. The filter cakes can be removed using a pH change in the down hole environment. One way of accomplishing this pH change is by using the fluids produced from subterranean formations. The pH change can be used to activate a peroxide source that will release peroxide that will in turn react with the peroxide degradable polymers.

Additional illustrative embodiments of the present invention are wellbore fluids containing an encapsulated peroxide source and peroxide degradable polymers.

The present invention also includes the forming a filter cake in a down hole environment by pumping a wellbore fluid into a well and allowing some of the fluid to filter into a subterranean rock formation. The wellbore fluid may include a peroxide source, such as an alkaline earth metal or zinc peroxide, a polysaccharide and any other desired solids (for example, calcium carbonate). The filter cake will contain the peroxide source, the polysaccharide and the other materials suspended in the wellbore fluid. Once the filter cake is no longer desired, it can be removed by altering the pH, for example by allowing a substantial portion of fluids produced from the subterranean formation to contact the filter cake. The resulting change in pH will cause the peroxide source to activate and release peroxide. The release of the peroxide results in the degrading of the polysaccharide polymer so as to weaken the filter cake. The weakened filter cake will be more readily removed and result in a bore hole that is permeable to the produced fluids and allows for greater production rates.

DESCRIPTION OF ILLUSTRATIVE EMBODIMENTS

The processes, methods and compositions described in this disclosure may be used to form an easily removed filter cake in a subterranean well. The filter cake may be formed by adding various components to a wellbore fluid, pumping the fluid into the wellbore and allowing the fluid to contact the desired subterranean formation.

The wellbore fluid may have a variety of compositions, the appropriate components of which can be selected by one skilled in the art. Preferably, the wellbore fluids are alkaline water based wellbore fluids. The pH of these solutions is preferably between about 7 to about 12, even more preferably between about 7.5 to about 10.5. The pH can be adjusted by methods known to those skilled in the art, including the addition of bases to the fluid. Such bases include potassium hydroxide, sodium hydroxide, magnesium oxide, calcium hydroxide and zinc oxide. These aqueous fluids are generally brine solutions. Such fluids can be natural brine solutions, seawater or brines formed by dissolving suitable salts in water. Suitable salts include chloride, bromide, acetate and formate salts of potassium, sodium, calcium, magnesium, zinc and cesium.

A variety of components may be added to the wellbore fluid to achieve different desired properties, as would be known to those skilled in the art. For example, the wellbore fluid may include viscosifiers, such as polysaccharides or polysaccharide derivatives. Some representative polymers are discussed in U.S. Pat. No. 4,846,981 and the references cited therein, all of which are hereby incorporated by reference.

It may also be desirable to add components to the wellbore fluid to help control fluid loss. Fluid loss additives keep wellbore fluids from entering the subterranean formations while allowing the wellbore fluid to be maintained at a pressure greater than that of the formation. This pressure overbalance acts to keep the formation fluids from entering the wellbore. A variety of materials have been used to control fluid loss, some of which are described in U.S. Pat. Nos. 5,354,786; 4,387,769 and; 4,836,940. In particular, various polymers have been used to control fluid loss, including polysaccharides.

Wellbore fluids of the present invention preferably contain polysaccharide polymers for incorporation into a filter cake. Preferred polysaccharide polymers include starch derivatives, cellulose derivatives, and biopolymers, such as: hydroxypropyl starch, hydroxyethyl starch, carboxymethyl starch, and their corresponding lightly crosslinked derivatives; carboxymethyl cellulose, hydroxyethyl cellulose, hydroxypropyl cellulose, methyl cellulose, dihydroxypropyl cellulose, and their corresponding lightly crosslinked derivatives; xanthan gum, gellan gum, welan gum and schleroglucan gum.

Various types of solids can be suspended in wellbore fluids to bridge or block the pores of a subterranean formation. Such solids include those described in U.S. Pat. Nos. 4,561,985; 3,872,018 and; 3,785,438, which are hereby incorporated by reference. For the purposes of the present invention, of particular interest are those solids soluble in acid solutions. Representative acid soluble bridging solids are calcium carbonate, limestone, marble, dolomite, iron carbonate and zinc oxide. However, other solids may be used without departing from the scope the present invention. Other representative solids include water soluble and oil soluble solids as described in U.S. Pat. No. 5,783,527.

The wellbore fluids of the present invention include a wellbore fluid that contains a peroxide source. Preferably, the peroxide source is an inorganic peroxide source such as peroxide compounds of zinc or alkaline earth metals. Magnesium peroxide is particularly preferred. Other peroxide sources known to those skilled in the art can be used without departing from the scope of the present invention.

Alkaline earth peroxides and zinc peroxide are known water insoluble compounds. See for example the following references, incorporated herein by reference: (a) "Peroxides, Superoxides, and Ozonides of Alkali and Alkaline Earth Metals," Il'ya Ivanovich Vol'nov (Translated by J. Woroncow, Edited by A. W. Petrocelli), Plenum Press, New York, 1966; (b) "Kirk-Othmer Encyclopedia of Chemical Technology," Third Edition, Vol. 17, John Wiley & Sons, 1982, pp. 1-26.

Inorganic peroxide compounds are commonly described as compounds whose structures include the peroxo-group, —O—O—. Simple peroxide compounds include peroxides in which the peroxo-group is bonded to a metallic atom via ionic bonding, and includes hydroperoxides characterized by the presence of the hydroperoxyl ion $(HO_2)^-$. Complex peroxide compounds include peroxides in which the peroxo-group as such, or in the form of $H_2O_2$ and $HO_2$, is bonded to the metallic atom by a covalent bond. Complex peroxide compounds also include the addition compounds formed with crystallized hydrogen peroxide.

The characteristic properties of peroxide compounds both simple and complex, are: the formation of hydrogen peroxide upon reaction with dilute acid solution, the liberation of oxygen as a result of thermal decomposition, and the liberation of oxygen upon reaction with water and other chemical agents. Further characterization is possible by dividing the simple inorganic peroxide compounds into four groups: (1) hydroperoxide, characterized by the $(HO_2)^-$ ion; (2) peroxides, characterized by the $(O_2)^{2-}$ ion; (3) superoxides characterized by the $(O_2)^-$ ion; and (4) ozonides, characterized by the $(O_3)^-$ ion.

The hydrolysis of peroxides and hydroperoxides proceeds as follows:

and

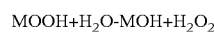

where M=metal. For this reason, peroxides and hydroperoxides are considered as being derived from hydrogen peroxide by replacement of one or both the hydrogen atoms by metal atoms.

Complex peroxide compounds include peroxyhydrates, for example, $CaO_2.2H_2O_2$, and peroxyhydrate hydrates, for example, $BaO_2.H_2O_2.20H_2O$.

Peroxides of calcium, strontium and barium belong to the $M^{2+}O_2^{2-}$ type of peroxide compounds, while peroxides of magnesium and zinc, of general formula $MO_2.xH_2O$, probably belong to the HO-M-OOH type where the covalent bond between the hydroperoxyl group and the metal atom is the same as that in hydrogen peroxide.

Calcium peroxide is generally prepared by industrial processes that provide a product containing 60-75 wt. % $CaO_2$. Reaction of $CaO_2.8H_2O$ with solutions containing greater than 20 wt. % of hydrogen peroxide results in the formation of calcium peroxyhydrate, $CaO_2.2H_2O_2$. Strontium peroxide, industrial grade, generally contains 80-95% $SrO_2$. Industrial grade barium peroxide generally contains up to about 90% $BaO_2$. Depending on its method of production, industrial grade magnesium peroxide contains from about 25% $MgO_2$ to about 50% $MgO_2$ and generally is a mixture of peroxide, oxide, and magnesium oxide hydrate. Industrial grade zinc peroxide contains about 55% $ZnO_2$. For all purposes of the present invention, the term "peroxide" includes all forms of peroxides, including simple peroxides, such as hydroperoxides characterized by the $(HO_2)^-$ ion and peroxides characterized by the $(O_2)^-$ ion, and complex peroxides such as peroxyhydrates and peroxyhydrate hydrates.

Although optional, free radical scavengers or reducing agents may be added to wellbore solution embodiments of the present invention. These materials may enhance the stability of the fluid and aid in avoiding premature degradation of the polysaccharide or other peroxide degradable polymers in the wellbore fluid. Representative reducing agents are water soluble sulfites, bisulfites, thiosulfates, dithionites, and mixtures thereof, particularly the alkali metal or ammonium salts thereof, preferably a water soluble thiosulfate, most preferably sodium thiosulfate. Representative antioxidants or free radical scavengers include water soluble mercaptans, thioethers, thiocarbonyls, low molecular weight alcohols and glycols, and mixtures thereof.

Certain embodiments of the present invention utilize peroxide sources that have been encapsulated. Prior art methods, such as that described in U.S. Pat. No. 5,783,527, suffer somewhat from premature release of peroxide that can degrade the filter cake and reduce the effectiveness of the polysaccharide polymers used for fluid loss and viscosifying purposes. This release occurs despite the formation of a coating of magnesium hydroxide that forms on the surface of the peroxide when it was added to water. This layer of magnesium hydroxide somewhat retards the release of peroxide. However, enough peroxide is still released to have negative effects on the filter cake and the properties of the drilling fluid.

It has been found that encapsulating the peroxide source can further aid in preventing the early release of peroxide. For the purposes of the present invention, an encapsulated peroxide is a peroxide that has a coating sufficient to control the release of peroxide until a set of conditions selected by the operator occurs. Some general encapsulating materials include natural and synthetic oils, natural and synthetic polymers and enteric polymers and mixtures thereof. However, many methods of encapsulating can be used without departing from the scope of the present invention. The preferred method of encapsulating the peroxide sources is by coating the peroxide with a polymer.

Similarly, many methods could be used to cause the release of the peroxide upon the occurrence of specific conditions desired by the operator. For example, the peroxide could be caused to be released by a change in temperature, pressure, pH, abrasion or any number of other environmental factors. A preferred method of releasing the peroxide for the purposes of dissolving a filter cake in a subterranean well is by having the peroxide release upon a change in pH in the down hole environment.

Those skilled in the art will appreciate that there are many possible mechanisms by which the coating may be removed. The methods discussed below are intended to illustrate possible methods by which this release might occur. This discussion is not intended to in any way limit the scope of the invention as set forth in the appended claims.

The coating polymer should preferably form a film around the peroxide source. The polymer should be chosen such that the coating will remain substantially intact until the desired release conditions occur. For the purposes of filter cake removal, it is preferable that the coating respond to changes in pH. The preferred polymers of the present invention are enteric polymers, which are defined for the purposes of this invention as polymers whose solubility characteristics are pH dependent. Here, this means that peroxide release is promoted by a change from conditions of a first predetermined pH value to a second predetermined pH condition.

Enteric polymers are commonly used in the pharmaceutical industry for the controlled release of drugs and other pharmaceutical agents over time. The use of enteric polymers allows for the controlled release of the peroxide source under predetermined conditions of pH or pH and temperature. For example the Glascol family of polymers are acrylic based polymers (available form Ciba Specialty Chemicals) are considered suitable enteric polymers for this invention because the solubility depends upon the pH of the solution.

In the case where pH alone is used to control peroxide release, a preferred illustrative embodiment of the present invention is to select as an encapsulating material an enteric polymer that is substantially insoluble at pH values greater than about 7.5 and that is more soluble under conditions of decreasing pH. Thus as the pH decreases in value (i.e. the solution becomes more acidic) release of peroxide is promoted. In one preferred illustrative embodiment the enteric polymer encapsulated peroxide is combined with an alkaline wellbore fluid of the type described above. This fluid is then pumped into the wellbore and a filter cake is formed that incorporates the encapsulated peroxide. The peroxide source can now be activated by causing the down hole environment to become more acidic and thereby degrade the encapsulating material. Again, it should be emphasized that this is merely one possible mechanism by which the peroxide release may occur in the down hole environment. Those skilled in the art will recognize that other factors, or a combination of factors, may in fact result in the peroxide's release. The methods discussed here are intended to illustrate possible mechanisms by which peroxide release may occur and are not intended to narrow the scope of the invention, as defined by the claims herein.

For example, abrasion may contribute to peroxide release. As discussed above, peroxides, such as magnesium peroxide, may form a protective coating when added to water. It is possible that the polymer coating enhances this natural coating, making the peroxide more resistant to abrasion. This abrasion resistance may result in the peroxide being more stable in the down hole environment and allowing its release to be more precisely controlled.

When the filter cake is no longer needed, it can be easily removed. In order to remove the filter cake, the peroxide source should be activated such that peroxide is released in the down hole environment. The peroxide will then react with and degrade any peroxide degradable polymers in the filter cake. As mentioned above, many different methods of activating the peroxide source can be used without departing from the scope of the present invention.

In a one illustrative embodiment where a peroxide coated with an enteric polymer is used, the method of activating the peroxide is by changing the pH value of the down hole environment. Preferably, an alkaline wellbore fluid is used to deliver the peroxide and form the filter cake. Subsequently, the down hole environment is made more acidic, causing the release of peroxide.

For the general purposes and scope of the present invention, the method of causing the down hole environment to become more acidic is not limited to any particular method. However, two preferred methods will be discussed. Generally, it has been discovered that milder clean up treatments than those reported in the prior art can be successfully used to remove peroxide containing filter cakes.

One such method is to add an acid source to the down hole environment from the surface. According to this method, an acidic soak solution is added to the well. The acidic soak solution will activate the peroxide, which will release peroxide, causing the peroxide degradable polymers (for example, polysaccharides) to degrade. The acid, depending about the acid selected and the strength of the acid, may also decompose the peroxide degradable polymers to some extent and may also be used to decompose acid soluble bridging agents (such as calcium carbonate). Additionally, the acid soak can be used remove an encapsulating material from the peroxide source, such as removing an acid soluble enteric polymer coating.

After decomposing the polysaccharide polymers with the acid solution, it is preferred that the filter cake containing the decomposed polymer be washed with a wash fluid in which the bridging particles are soluble, such as by contacting or circulating within the borehole the washing fluid. In this manner, the major components of the filter cake are decomposed or removed, and the filter cake is effectively destroyed and removed from the sides of the borehole.

In one non-limiting example of a clean up solution, it is preferred that the acidic soak solution have no appreciable solubilizing effect on the bridging particles within the filter cake. This prevents the premature breakthrough of the soak solution through a portion of the filter cake and, hence, allows all of the filter cake to be contacted by the soak solution until the peroxide has decomposed the polysaccharide polymers substantially. If the bridging particles are water soluble, preferably the aqueous liquid in the soak solution will be saturated with respect to the bridging particles. Thus if the bridging particles are sized sodium chloride, the aqueous liquid will preferably be saturated with respect to sodium chloride. Additionally, the soak solution should have a density that is compatible with the density of the liquid in the borehole that the soak solution displaces in order to minimize mixing of the soak solution with the liquid. Preferably the soak solution contains inorganic water soluble salts dissolved therein in amounts up to saturation to provide the desired density. Typical salts are generally selected from the group consisting of sodium chloride, sodium bromide, potassium chloride, potassium bromide, calcium chloride, calcium bromide, zinc chloride, zinc bromide, sodium formate, potassium formate, cesium formate, and mixtures thereof. Certain of these salts are acidic, and, thus, they may also function as acidic substances to provide the required pH.

In this example, it is preferred that the soak solution be solids-free, i.e., contain no appreciable content of suspended solids, thus contains essentially only dissolved substances. The soak solution may be filtered using procedures well known in the art of using clear brine fluids, if desired.

Although many types of clean up fluids can be used, one example is a soak solution that is preferably acidic to solubilize and activate the peroxide in the filter cake. As mentioned above, it has been discovered that milder clean up solutions can be used than those reported in the prior art. Representative acidic substances include hydrochloric acid, phosphoric acid, formic acid, acetic acid, proprionic acid, glycolic acid, sulfamic acid, citric acid, aluminum chloride, zinc chloride, zinc bromide, calcium bromide, ferric chloride, sodium dihydrogen phosphate, sodium acid pyrophosphate, acidic buffers, and the like. Sulfamic acid and citric acid are preferred.

In certain clean up solutions, it may be preferable, as will be appreciated by those skilled in the art, that the acidic solution comprise an acid in a saturated solution of a water soluble salt in which the bridging particles are not soluble, and that the bridging particles are water soluble. It is particularly preferred that the water soluble salt and the bridging particles are sodium chloride.

When clean up solutions such as those described above are used, the soak solution should contact the filter cake for a period of time that is at least sufficient to decompose the polysaccharide polymers in the filter cake to such an extent that the filter cake becomes a loosely adherent mass of bridging particles. The greater the acid strength or the higher the formation temperature, and hence, the higher the temperature to which the soak solution is heated, the lower the time required to contact the filter cake with the soak solution. Generally, the soak solution will contact the filter cake from approximately one-half to ten hours. Thereafter the filter cake is preferably contacted with a wash solution to remove the remaining filter cake solids, principally the bridging particles and any remaining polymers and polymer degradation products.

The wash solution is one in which the bridging particles are at least partially soluble. Thus if the bridging solids are water soluble, the wash solution is undersaturated with respect to the bridging solids. If the bridging solids are acid soluble, a suitable acidic solution is used as the wash solution. If the bridging solids are oil or solvent soluble, a suitable oil or solvent is used as the wash solution.

It is preferred that the wash solution have no appreciable effect on the permeability of the hydrocarbon-containing formation. Thus aqueous solutions containing one or more salts which inhibit the swelling and/or dispersion of particles within the formation are preferred. Representative of such salts are potassium salts, such as potassium chloride and potassium acetate, ammonium chloride, quaternary ammonium salts of low molecular weight, such as tetramethyl ammonium chloride, tetraethylammonium chloride, and in general tetraalkylammonium salts in which the alkyl groups independently contain from 1 to about 4 carbon atoms, and other salts as is known in the art. Preferably the wash solution will contain from about 0.05% to about 10% by weight of the salt, most preferably from about 0.1% to about 5%. It is particularly preferred that the wash solution contain from about 2% to about 5% by weight potassium chloride or ammonium chloride.

A second illustrative method of acidifying the down hole environment such that a peroxide source is activated has been discovered in which fluids produced from the subterranean formation can be successfully used. It is known that formation fluids are typically acidic due to the presence of carbon dioxide, sulfur, mineral acids, oxygen and organic acids. Typically, these substances have been problematic due to their corrosive effects on wellbore apparatus, see, for example, U.S. Pat. Nos. 4,837,323; 5,960,878 and; 6,248,700.

The acidic formation fluids can be used to activate peroxide sources in the down hole environment, obviating the need for acid solutions to be added to the wellbore. This is advantageous because it saves the operator the money otherwise spent on the acid treatments, labor costs and lost rig time while administering the acid soak and avoids possible damage to the subterranean formations from the acid soak and wash solutions. However, additional fluids may be used in addition to the produced fluids without departing from the scope of the present invention, so long as a substantial portion of produced fluids are used. For purposes of the present invention, a substantial portion of produced fluids means an amount sufficient to cause a change in the pH value of a down hole environment.

The formation fluids can be used to activate unencapsulated peroxide sources. Additionally, the formation fluids can be the stimulus that results in the removal of an encapsulating material from a protected peroxide source. In particular, the formation fluids can be used to lower the pH of a filter cake containing peroxides encapsulated in an enteric polymer. The formation fluids may activate peroxides coated with an enteric polymer.

In either method of acidifying the down hole environment, an activator can be included in the acidic soak solution to further activate the peroxide and/or to increase the rate of reaction between the peroxide and the polysaccharide. Known activators include iron and copper salts as well as salts of other transition metals, such as soluble ferric, ferrous, cuprous, cobaltous, nickelous, manganous, and the like salts. The activator should be soluble in the soak solution. The preferred metallic cation activator is a source of the ferric or ferrous cation, such as ferrous sulfate, ferrous ammonium sulfate, ferrous chloride, ferric ammonium sulfate, and the like. The amount of activator, if used, is not critical and need only be sufficient to provide the desired rate of reaction. Generally, a metallic cation activator will be present in an amount from about 0.00025% to about 0.0025% by weight of the soak solution.

Other activators that are effective in the present invention have been discovered to be water soluble organic hydroxyl compounds having the empirical formula $$HO-C_aH_{2a}-Z$$

where a is an integer from 1 to about 5, and Z is a radical selected from the group consisting of H, OH, and $(OC_bH_{2b})_nOR$ where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5 and y is an integer from 1 to 3. Preferably a=2 or 3, and $Z=(OC_bH_{2b})_nOR$ provided that when n=0, $R=C_xH_{2x+1}$. Thus it is preferred that the water soluble hydroxy-containing organic compound activator contain at least one ether group or radical within its molecular structure. Generally, a water soluble organic hydroxyl compound activator will be present in the soak solution in an amount from about 0.1% to about 2.5% by volume, preferably from about 0.2% to about 1.0% by volume.

The following examples are included to demonstrate certain illustrative embodiments the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should appreciate that many changes, consistent with the present disclosure, can be made in the specific embodiments which are disclosed and still obtain a like or similar result without departing from the scope of the invention.

The following examples describe the preparation of an encapsulated peroxide source of the present invention and results from experiments probing the qualities of the encapsulated peroxide under simulated well conditions.

EXAMPLE 1

Finely powdered magnesium peroxide is encapsulated in a 10% (wt/wt) coating of acrylic polymer. First, 20 grams of magnesium peroxide was added, with agitation, to a mixture of 10 ml of the acrylic polymer solution (at 20% (wt/wt) solids) and 20 ml of water. The resulting slurry was dried out at 93° C. for 30 minutes. The material was cooled and the resulting solid ground to a fine powder.

EXAMPLE 2

The material produced from Example 1 was subjected to a leak off test in order to test the effectiveness of the encapsulated peroxide in degrading the filter cake under simulated wellbore conditions. The test involved exposing filter cakes to 3% (wt/wt) KCl brine and carbon dioxide for a set period at high temperatures and pressures and then measuring the flow of the brine through the filter cake. This measurement gives a relative comparison of how each treatment has degraded the filter cake.

TABLE 1

Composition of Wellbore Fluid Used in Fluid Leak Off and Fluid Loss Tests Described in Example 2.

| Material | Fluid Tested at 93 and 113 degrees Celsius | Fluid Tested at 123 degrees Celsius |
|---|---|---|
| Water | 332.0 | 332.0 |
| Defoamer | 0.2 | 0.2 |
| KCl | 26.0 | 26.0 |
| Fine Calcium Carbonate (Safecarb M) | 42.0 | 42.0 |
| Biopolymer Viscosifier | 1.5 | 1.5 |
| Starch Based Fluid Loss Additive (Dualtrol) | 5.0 | — |
| High Temperature Starch Based Fluid Loss Additive (Exstar HT) | — | 5.0 |
| Biocide (Safecide) | 0.2 | 0.2 |

In this series of experiments, the goal was to determine whether peroxide would be released under the simulated reservoir conditions. Mildly acidic conditions were used in the test to simulate the conditions found in a typical wellbore due to the presence of carbon dioxide. The test consisted of the following steps.

First, a fluid loss test was performed to grow filter cakes on 10 micron pore diameter ceramic discs at the respective test temperatures and 500 psi nitrogen differential pressure for two hours. Second, the cell was emptied and then filled with a 3% potassium chloride solution to represent the displacement to completion brine. Third, a mildly acidic environment was produced by pressurizing the cell to 300 psi with carbon dioxide and statically aging it for 16 hours at 80° C. Finally, after aging, the brine leak off rate through the filter cake at 100 psi nitrogen differential pressure was measured. This final step is useful to determine how the filter cake has changed compared to control formulations. The test also provides information about spurt and fluid loss measurement that can be used to give an indication of whether the polymers have been degraded by premature release of peroxide.

TABLE 2

Results of Fluid Loss Test at 93, 113 and 123° C. as Described in Example 2.

| | | Fluid Loss (ml) Using: | | |
|---|---|---|---|---|
| Temperature (° C.) | Test | Base Fluid | Base Fluid + 5 g Magnesium Peroxide | Base + 5 g Polymer Encapsulated Magnesium Peroxide |
| 93 | Spurt | 3.0 | 3.5 | 3.0 |
| | 120 min | 17.0 | 25.8 | 18.0 |
| 113 | Spurt | 2.7 | 6.5 | 2.3 |
| | 120 min | 21.3 | 43.2 | 25.8 |
| 123 | Spurt | 2.7 ml | 5.2 | 1.5 |
| | 120 min | 19.7 | 33.6 | 21.3 |

The test outlined above was performed on three separate materials. First, the test was performed on a base fluid, the contents of which are summarized in Table 1. Second, the test was performed on the base fluid to which had been added 5 grams of magnesium peroxide. Finally, the test was performed on the base fluid plus 5 grams of polymer encapsulated magnesium peroxide, as described in Example 1.

TABLE 3

Results for Fluid Leak Off Test at 93, 113 and 123° C. as Described in Example 2.

| | | Fluid Leak Off (ml) Using | | |
|---|---|---|---|---|
| Temperature (° C.) | Test | Base Fluid | Base Fluid + 5 g Magnesium Peroxide | Base Fluid + 5 g Polymer Encapsulated Magnesium Peroxide |
| 93 | Spurt | 0.5 | 1.0 | >50 |
| | 120 minutes | 5.9 | 23.1 | — |
| 113 | Spurt | 0.3 | 1.0 | >50 |
| | 7.5 minutes | 2.5 | >50 | — |
| | 120 minutes | 12.4 | — | — |
| 123 | Spurt | Trace | 3.5 | >50 |
| | 5 minutes | 2.9 | >50 | — |
| | 120 minutes | 29.0 | — | — |

The spurt and fluid loss test results for the three materials at 93, 113 and 123 degrees Celsius are summarized in Tables 2, 3 and 4 respectively. The results of the leak of tests at the same three temperatures are summarized in Tables 5, 6 and 7.

The results of these tests demonstrate that polymer encapsulation is an effective way to prevent early release of peroxide. The values for the fluid loss test are very similar using both the base fluid alone and using the base fluid plus the encapsulated peroxide. By contrast, the values for the base fluid plus non-encapsulated peroxide are much higher for both the spurt test and after two hours-indicating that peroxide is already breaking down the filter cake. However, after the filter cake and the test fluids were exposed to carbon dioxide, the situation reversed itself. After carbon dioxide exposure, the base solution containing the encapsulated peroxide results very close to those

TABLE 4

Composition of Wellbore Fluid Used in Fluid Leak Off and Fluid Loss Tests for the Coated Peroxide Described in Example 3.

| Material | Fluid Tested at 93° C. |
|---|---|
| Water | 332.0 |
| Defoamer | 0.2 |
| KCl | 26.0 |
| Fine Calcium Carbonate (Safecarb M) | 30.0 |
| Biopolymer Viscosifier | 1.5 |
| Starch Based Fluid Loss Additive (Dualtrol) | 5.0 |
| Biocide (Safecide) | 0.2 |
| Fine Clay solids (Simulated Contamination) | 12 | obtained using the base solution plus the non-encapsulated peroxide. In both these cases, there is essentially no leak off control, indicating the filter cake has become greatly weakened.

EXAMPLE 3

Magnesium peroxide is coated with Magnafloc polymer. The polymer used in this test is Magnafloc E30 and is obtained from Ciba Specialty Chemicals as a 27% (wt/vol) polymer solids content water in oil emulsion. First, 5.6 ml of the polymer emulsion is added, with agitation, to 10 g of finely powered magnesium peroxide to give a 15% (wt/wt) polyacrylamide coating on the magnesium peroxide. Mixing of the sample continues for 5 minutes to ensure homogeneity. Following this, 5 g of the coated material is added to the fluid described in Table 4. This mixture is then tested using the method described in Example 2 at 93° C. The results from this test are presented in Tables 5 and 6.

TABLE 5

Results of Fluid Loss Test at 93° C. Using the Coated Peroxide Described in Example 3.

| | | Fluid Loss (ml) Using: | | |
|---|---|---|---|---|
| Temperature (° C.) | Test | Base Fluid | Base Fluid + 5 g Magnesium Peroxide | Base Fluid + 5 g Polyacrylamide Wet Coated Magnesium Peroxide |
| 93 | Spurt | 3.0 | 3.0 | 3.0 |
| | 120 min | 14.3 | 23.4 | 15.6 |

TABLE 6

Results for Fluid Leak Off Test at 93° C. Using Coated Peroxide Described in Example 3.

| | | Fluid Leak Off (ml) Using | | |
|---|---|---|---|---|
| Temperature (° C.) | Test | Base Fluid | Base Fluid + 5 g Magnesium Peroxide | Base Fluid + 5 g Polyacrylamide Wet Coated Magnesium Peroxide |
| 93 | Spurt | 0.5 | 25 | 20 |
| | Time | 16.9 | 50 | 50 |
| | Lapse | (after 120 minutes) | (after 90 seconds) | (after 120 seconds) |

The purpose of example 3 is firstly, it demonstrates an alternative "wet" method of preparation, where the polymer does not have to be dried on to the surface of the particle. Secondly, it shows that polyacrylamide homopolymer functions as a coating and encapsulating material, as it prevents premature release of peroxide, as shown by the data in table 5 compared to a fluid contain uncoated magnesium peroxide and that it allows the release of peroxide when the pH is reduced as shown by the data in Table 6.

In view of the above disclosure, one of skill in the art should understand and appreciate that one illustrative embodiment of the present invention is generally directed to a wellbore fluid including a peroxide degradable polymer and an encapsulated peroxide source. In a preferred illustrative embodiment, the peroxide degradable polymer is a polysaccharide. The encapsulated peroxide source is another embodiment of the present invention. In a preferred illustrative embodiment, the peroxide source that has been encapsulated is an inorganic peroxide compound. In a more preferred illustrative embodiment, the inorganic peroxide compound is a peroxide compound of zinc, alkaline earth metals, and combinations thereof. In a particularly preferred illustrative embodiment, the peroxide source is magnesium peroxide.

The encapsulating material is preferably stable in liquids having a pH value of about 7.5 or greater. In a preferred illustrative embodiment, the encapsulating material is a polymer. In a more preferred illustrative embodiment, the polymer is an enteric polymer. In a particularly preferred illustrative embodiment, the polymer is a copolymer of acrylic acid or its derivatives and at least one acrylate compound. Even more particularly preferred are copolymers of a mixture of monomers selected from acrylic acid, acrylamide, methacrylic acid, ethyl acrylate, methyl methacrylate, and combinations thereof.

In another illustrative embodiment, the present invention is directed generally to a process for using fluids produced from a subterranean rock formation to cause a change in pH of a down hole environment that will cause a peroxide source to activate. In one preferred illustrative embodiment, the produced fluids are used to change the pH of a filter cake. In a different preferred illustrative embodiment, the produced fluids are used to change the pH of a wellbore fluid in the down hole environment.

In another preferred illustrative embodiment, the peroxide source is provided to the down hole environment in a wellbore fluid. In a more preferred illustrative embodiment, the wellbore fluid is one of the above described wellbore fluids containing an encapsulated peroxide source and/or a peroxide degradable polymer. In a particularly preferred illustrative embodiment, the wellbore fluid contains an inorganic peroxide source, even more particularly preferred are peroxide compounds of zinc, alkaline earth metals, and combinations thereof. Magnesium peroxide is a more particularly preferred peroxide source.

The utility of the present invention is further demonstrated in an additional illustrative embodiment of the present invention. This embodiment is directed to a process for degrading polysaccharide polymers contained in a filter cake located on a subterranean rock formation. The process includes the steps of suspending a peroxide source in a wellbore fluid, the wellbore fluid having a pH value greater than about 7.5. Additional compounds, as would be known to be desirable to those skilled in the art, can be included in the wellbore fluid without departing from the scope of present invention. As the wellbore fluid is pumped into the well, some of the fluid should be allowed to filter into a subterranean rock formation and thereby produce a filter cake. The filter cake should contain the polysaccharides, the peroxide source and any other materials suspended in the wellbore fluid. Work can now be done on the well without damaging the protected formation. When any desired work has been completed, the filter cake can be removed by bringing the well into production of a subterranean rock formation fluid. As a substantial portion of formation fluids contact the filter cake, the pH of the down hole environment will lower, allowing the peroxide source to activate. As the peroxide source activates, it will release peroxide that will in turn degrade the polysaccharide polymers. The filter cake will be weakened by the degradation of the polymers and hence be more permeable to the production fluids, resulting in increased rates of production.

In a preferred illustrative embodiment, the peroxide source is one of the peroxide sources described above. In a more preferred illustrative embodiment, the peroxide source has been encapsulated as described in other embodiments of the invention.

While the compositions, methods and processes of this invention have been described in terms of preferred illustrative embodiments, it will be apparent to those of skill in the art that variations may be applied to the processes and compositions described herein without departing from the content and scope of the invention. Additionally, the processes, methods and compositions described in this disclosure are not intended to be limited to any particular art. All such similar substitutes and modifications apparent to those skilled in any relevant art where these processes, methods and compositions may find use are deemed to be within the scope and concept of the invention as it is set out in the following claims.

What is claimed is:

1. A wellbore fluid comprising a peroxide degradable polymer and an encapsulated peroxide source, wherein the encapsulated material is an enteric polymer that is substantially insoluble in wellbore fluids having a pH value greater than about 7.5.

2. The wellbore fluid of claim 1 wherein the enteric polymer comprises a film-forming polymer.

3. The wellbore fluid of claim 2 wherein the enteric polymer comprises a copolymer of acrylic acid and acrylate compounds.

4. The wellbore fluid of claim 2 wherein the enteric polymer comprises a copolymer of a mixture of monomers selected from acrylic acid, acrylamide, methacrylic acid, ethylacrylate, methyl methacrylate, and combinations thereof.

5. The wellbore fluid of claim 1 wherein the peroxide source comprises an inorganic peroxide compound.

6. The wellbore fluid of claim 5 wherein the inorganic peroxide is selected from a zinc peroxide, alkaline earth metal peroxides, and combinations thereof.

7. The wellbore fluid of claim 6 wherein the alkaline earth metal peroxide comprises magnesium peroxide.

8. The wellbore fluid of claim 1, wherein the peroxide degradable polymer comprises a polysaccharide.

* * * * *